United States Patent [19]

Okumura

[11] Patent Number: 5,279,846
[45] Date of Patent: Jan. 18, 1994

[54] CHOCOLATE COMPOSITION
[75] Inventor: Yoshifumi Okumura, Tokyo, Japan
[73] Assignee: Asahi Denka Kogyo Kabushiki Kaisha, Tokyo, Japan
[21] Appl. No.: 926,409
[22] Filed: Aug. 10, 1992

Related U.S. Application Data

[63] Continuation of Ser. No. 699,922, May 14, 1991, abandoned.

[30] Foreign Application Priority Data

Apr. 28, 1989 [JP] Japan ................................. 1-110130

[51] Int. Cl.⁵ ............................................. A23D 9/00
[52] U.S. Cl. .................................... 426/601; 426/306; 426/607; 426/631; 426/660
[58] Field of Search ............... 426/601, 607, 306, 606, 426/660, 631

[56] References Cited

U.S. PATENT DOCUMENTS

| | | | |
|---|---|---|---|
| 4,594,259 | 6/1986 | Baker et al. | 426/613 |
| 4,910,037 | 3/1990 | Sagi et al. | 426/601 |
| 4,956,287 | 9/1990 | Suzuki et al. | 435/134 |
| 5,023,101 | 6/1991 | Sugihara et al. | 426/607 |

FOREIGN PATENT DOCUMENTS 63-273485 11/1988 Japan.

*Primary Examiner*—Helen F. Pratt
*Attorney, Agent, or Firm*—Young & Thompson

[57] ABSTRACT

A chocolate composition comprising from 5 to 70% by weight, based on the total fats of the chocolate, of a triglyceride (SLS) having saturated fatty acid residues at the α-positions and a linoleic acid residue at the β-position.

1 Claim, 1 Drawing Sheet

CHOCOLATE COMPOSITION

This application is a continuation of application Ser. No. 07/699,922, filed May 14, 1991, now abandoned.

BACKGROUND OF THE INVENTION

1. Field of the Invention

This invention relates to a chocolate composition. The chocolate composition of the present invention involves off-specification chocolate-like compositions. In particular, the present invention is applicable to composite chocolate confectionery products wherein common chocolate is combined with edible materials such as snacks, crackers or biscuits an thus gives a product which scarcely suffers from deformation with time.

2. Description of the Prior Art

In recent years, consumers' fondness for chocolate has turned from common chocolate products such as slab chocolate to composite chocolate confectionery products wherein chocolate is combined with other edible materials. These composite chocolate confectionery products include so-called truffle type chocolate products, wherein a cream or a chocolate of a higher meltability in mouth is filled in a chocolate shell, and composite chocolate confectionery products, wherein chocolate is combined with edible materials such as snacks, crackers or biscuits. Further, products of the latter type may be produced by various processes, for example, sandwiching, filling and coating.

There are problems common to all of these composite chocolate confectionery products, for example, deformation with time which is seemingly caused by the difference in physical properties or composition between the chocolate and other edible materials.

In the case of a product obtained by sandwiching chocolate between edible materials such as biscuits or crackers, for example, the edible materials are apt to separate from the chocolate with the lapse of time. When a similar edible material is coated with chocolate, some portion or the whole of the chocolate coating sometimes deforms and thus separates from the edible material. The distortion or deformation in the chocolate coating impairs the sales appeal of the product. Furthermore, similar phenomena are also observed in truffle-type chocolate products.

A conventional method for overcoming the aforesaid problems comprises softening chocolate by simultaneously using a fat which is softer than those commonly used in chocolate (for example, milk fat, oil or those similar thereto). Presumably the deformation with time of chocolate can be relieved by softening the chocolate and thus the deformation, separation or liberation of the chocolate from an edible material can be suppressed.

However the characteristic flavor of milk fat restricts the flavor of chocolate containing the same. In addition, it is unavoidable that the heat resistance of the chocolate is lowered thereby. When an oil is used, on the other hand, the heat and blooming resistances of chocolate are lowered.

SUMMARY OF THE INVENTION

It is an object of the present invention to provide a chocolate composition which is free from any deformation with time and excellent in heat and blooming resistances and has a good flavor and a high meltability in mouth.

In the present invention, the aforesaid object has been achieved by providing a chocolate composition comprising from 5 to 70% by weight, based on the total fats in the chocolate, of a triglyceride having saturated fatty acid residues at the $\alpha$-positions and a linoleic acid residue at the $\beta$-position.

The chocolate composition of the present invention, which scarcely suffers from deformation with time, is excellent in heat and blooming resistances and has a good flavor and a high meltability in mouth, and is applicable to various composite chocolate confectionery products, thus making it possible to produce products which scarcely suffer from deformation with time.

DETAILED DESCRIPTION OF THE INVENTION

Figure 1:
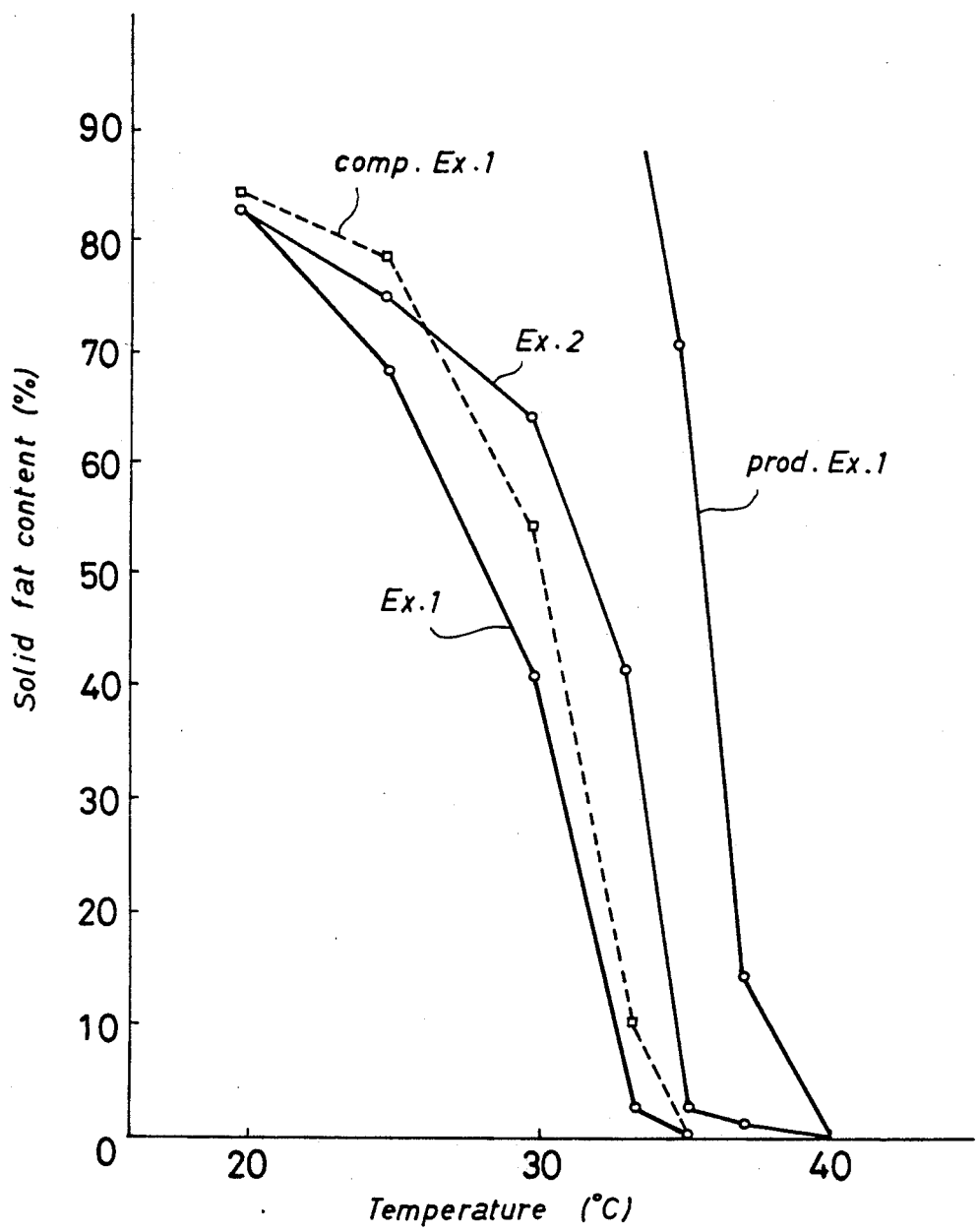
FIG. 1 is a graph showing the relationship between the solid fat content and the temperature of each of the SLS-containing fat of Production Example 1, the fats of Examples 1 and 2 and the cacao butter of Comparative Example 1.

The term "$\alpha$-position" as used herein refers to each of the 1- and 3-positions of a triglyceride while the term "$\beta$-position" to the 2-position thereof.

The triglyceride having saturated fatty acid residues at the $\alpha$-positions and a linoleic acid residue at the $\beta$-position to be used in the present invention [hereinafter referred to as SLS (S: saturated fatty acid, L: linoleic acid)] is a so-called symmetric triglyceride and has a sufficient hardness at room temperature and an excellent meltability in mouth.

Examples of the fatty acid residues constituting the aforesaid SLS include myristic, palmitic, stearic, arachic, and behenic acid residues among which stearic, arachic and behenic acid residues are preferable from the viewpoint of maintaining the heat resistance of chocolate.

The chocolate composition of the present invention may be obtained by blending the SLS or a fat containing the same (SLS-containing fat) with chocolate ingredients in such a manner as to adjust the content of the SLS to from 5 to 70% by weight, preferably from 10 to 60% by weight, based on the total fats of the chocolate. When the content of the SLS is smaller than 5% by weight, any satisfactory effect of suppressing deformation with time cannot be achieved. When said content exceeds 70% by weight, on the other hand, the meltability in mouth of the chocolate is deteriorated and, furthermore, the flavor of the chocolate is deteriorated since the contents of cacao mass and cacao powder are decreased.

The SLS-containing fat may be produced by transesterifying a fat containing a large amount of the linoleic acid residue at the $\beta$-position (for example, safflower oil) with saturated fatty acid(s) and/or saturated fatty acid ester(s) by using lipase having a selectivity for the $\alpha$-position, followed by common separating and refining procedures (refer to U.S. Pat. No. 4,956,287).

Although the viscosity of the chocolate composition of the present invention is apt to rise upon tempering, the tempering can be smoothly effected by using an oil-soluble emulsifier such as lecithin or condensed polyglycerol ricinoleate.

The chocolate ingredients other than the SLS to be used in the chocolate composition of the present invention may be appropriately selected depending on the type of the desired chocolate product.

The chocolate composition of the present invention is useful as a composite chocolate such as a chocolate coating for an edible material or a chocolate filling for being sandwiched between edible materials.

Examples of the edible materials include baked products such as bread, cake, doughnut, cream puff, pie, waffle and sponge cake, biscuits, cookies, crackers, pretzels, flakes, wafers, pie, puffs, snacks such as potato chips, marshmallows, rice cakes and Japanese confectioneries.

To further illustrate the present invention, the following Examples and Comparative Examples will be given.

Production Example 1

In accordance with the description of U.S. Pat. No. 4,956,287, safflower oil was reacted with stearic acid. After removing the liberated fatty acids, the middle oil fraction was collected by solvent fractionation and refined to thereby give an SLS-containing fat. This SLS-containing fat contained 82% of SLS carrying a linoleic acid residue at the $\beta$-position and stearic acid residues at the $\alpha$-positions and 14% of a triglyceride carrying an oleic acid residue at the $\beta$-position and stearic acid residues at the $\alpha$-positions, when analyzed by HPLC. Examples 1 and 2 and Comparative Example 1

65 parts (by weight; the same will apply hereinafter) of the SLS-containing fat obtained in Production Example 1 was blended with 35 parts of a moderate melting point fraction of palm oil (Example 1). Separately, 80 parts of the SLS-containing fat of Production Example 1 was blended with 20 parts of the moderate melting point fraction of palm oil (Example 2). Further, cacao butter was used in Comparative Example 1. The solid fat content (SFC) of the SLS-containing fat of Production Example 1, the fat compositions of Examples 1 and 2 and the cacao butter of Comparative Example 1 were determined by NMR.

Table 1 and FIG. 1 show the results.

TABLE 1

|  |  | Prod. Ex. 1 | Ex. 1 | Ex. 2 | Comp. Ex. 1 |
|---|---|---|---|---|---|
| SLS-containing fat of Prod. Ex. 1 (parts) | | 100 | 65 | 80 | — |
| Moderate m.p. fraction of palm oil (parts) | | 0 | 35 | 20 | — |
| SFC (%) | 20 (°C.) | — | 83.4 | 82.7 | 84.7 |
| at each | 25 | — | 71.3 | 75.5 | 78.5 |
| temperature | 30 | — | 40.7 | 64.3 | 54.2 |
|  | 33 | — | 5.8 | 41.3 | 10.2 |
|  | 35 | 70.8 | 0.4 | 2.3 | 0.8 |
|  | 37 | 14.4 | 0 | 1.3 | 0 |
|  | 40 | 0 | 0 | 0 | 0 |
| SLS* content (%) | | 82 | 53.3 | 65.6 | — |

*SLS carrying stearic acid residues at the $\alpha$-positions.

As apparent from Table 1 and FIG. 1, the fat of each of Examples 1 and 2 was almost the same as the fat of Comparative Example 1 (i.e., cacao butter) in SFC and each showed a good meltability in mouth. In contrast, the fat of Production Example 1 had an SFC value of 70.8, 14.4 and 0.0, respectively, at 35°, 37° and 40° C. and showed a poor meltability in mouth.

Examples 3 and 4 and Comparative Example 2

By using the fat composition of Example 1, chocolates were produced in accordance with the formulations as specified in the following Table 2.

TABLE 2

| Chocolate formulation (parts) | | | |
|---|---|---|---|
|  | Ex. 3 | Ex. 4 | Comp. Ex. 2 |
| sucrose | 45 | 45 | 45 |
| whole fat milk powder | 15 | 15 | 15 |
| cacao mass (50% cacao butter) | 20 | 20 | 20 |
| cacao butter | 15 | 10 | 20 |
| fat composition of Ex. 1 | 5 | 10 | 0 |
| lecithin | 0.4 | 0.4 | 0.4 |
| emulsifier* | 0.2 | 0.2 | 0.2 |
| vanillin | 0.03 | 0.03 | 0.03 |

*Condensed polyglycerol ricinoleate.

The contents of the SLS carrying stearic acid residues at the $\alpha$-positions in the total fats of the chocolates of Examples 3 and 4 and Comparative Example 2 were, respectively, 7.7, 15.5 and 0%.

The chocolates of Examples 3 and 4 and Comparative Example 2 were tempered and then sandwiched between biscuits. After solidifying by cooling, the obtained products were allowed to stand at 20° C. to thereby observe the changes with time. As a result, the products obtained from the chocolates of Examples 3 and 4 showed neither deformation nor separation. In the case of the product obtained from the chocolate of Comparative Example 2, on the other hand, the biscuits were mostly separated from the chocolate within approximately 1 month.

Furthermore, the chocolates of Examples 3 and 4 and Comparative Example 2 were tempered and then hard biscuits were coated therewith. The obtained products were allowed to stand at 20° C. to thereby observe the changes with time. As a result, the products obtained from the chocolates of Examples 3 and 4 showed no change. In the case of the product obtained from the chocolate of Comparative Example 2, on the other hand, the chocolate coating suffered from deformation within 2 to 4 weeks and thus the chocolate separated out or suffered from distortion or cracking.

Example 5 and Comparative Example 3

By using the SLS-containing fat of Production Example 1, chocolates were produced in accordance with the formulation as specified in the following Table 3.

TABLE 3

| Chocolate formulation (parts) | | |
|---|---|---|
|  | Ex. 5 | Comp. Ex. 3 |
| sucrose | 45 | 45 |
| skimmed milk (powder) | 10 | 10 |
| cacao powder (13% cacao butter) | 10 | 10 |
| cacao butter | 10 | — |
| fat composition of Prod. Ex. 1 | 25 | 35 |
| lecithin | 0.4 | 0.4 |
| emulsifier* | 0.2 | 0.2 |
| vanillin | 0.03 | 0.03 |

*Condensed polyglycerol ricinoleate.

The contents of the SLS in the total fats of the chocolates of Example 5 and Comparative Example 3 were, respectively, 52.0 and 77.7%.

The chocolate of Example 5 showed a good meltability in mouth and an excellent flavor. The chocolate of Example 5 was tempered and sandwiched between biscuits. After solidifying by cooling, the product was allowed to stand at 20° C. As a result, neither deformation nor separation was observed.

The chocolate of Comparative Example 3 had a poor meltability in mouth and lacked the flavor characteristic to chocolate.

What is claimed is:

1. A chocolate composition comprising from 10 to 60% by weight, based on the total fats of the chocolate, of a triglyceride having saturated fatty acid residues at the α-positions and a linoleic acid residue at the β-position, said triglyceride having been produced by transesterifying a fat.

* * * * *